United States Patent
Pallone et al.

(10) Patent No.: US 8,515,091 B2
(45) Date of Patent: Aug. 20, 2013

(54) FORWARDING AN AUDIO SIGNAL IN AN IMMERSIVE AUDIO CONFERENCE SYSTEM

(75) Inventors: Grégory Pallone, Trelevern (FR); Jean-Philippe Thomas, Trevou Treguignec (FR)

(73) Assignee: France Telecom, Paris (FR)

( * ) Notice: Subject to any disclaimer, the term of this patent is extended or adjusted under 35 U.S.C. 154(b) by 1022 days.

(21) Appl. No.: 12/215,226

(22) Filed: Jun. 26, 2008

(65) Prior Publication Data

US 2009/0010441 A1    Jan. 8, 2009

(30) Foreign Application Priority Data

Jun. 26, 2007   (FR) ...................................... 07 56017

(51) Int. Cl.
*H04R 1/38*    (2006.01)
(52) U.S. Cl.
USPC ................... 381/74; 381/55; 381/57; 381/66; 379/202.01; 379/203.01; 709/24; 709/205
(58) Field of Classification Search
USPC ............. 381/2, 55, 66, 57; 379/201.1, 203.1, 379/204.1, 205.1, 206.1; 79/24, 205
See application file for complete search history.

(56) References Cited

U.S. PATENT DOCUMENTS

| | | | | |
|---|---|---|---|---|
| 5,889,843 A | * | 3/1999 | Singer et al. | 379/202.01 |
| 6,256,394 B1 | * | 7/2001 | Deville et al. | 381/94.7 |
| 6,728,221 B1 | * | 4/2004 | Shaffer et al. | 370/260 |
| 6,850,496 B1 | | 2/2005 | Knappe et al. | |
| 7,012,630 B2 | | 3/2006 | Curry et al. | |
| 2003/0081115 A1 | | 5/2003 | Curry et al. | |
| 2005/0018039 A1 | | 1/2005 | Lucioni | |
| 2006/0146735 A1 | * | 7/2006 | Shaffer et al. | 370/260 |
| 2006/0209728 A1 | * | 9/2006 | van der Gaast | 370/260 |

FOREIGN PATENT DOCUMENTS

WO    WO 97/33450    9/1997

* cited by examiner

*Primary Examiner* — Steven Loke
*Assistant Examiner* — Cuong Nguyen
(74) *Attorney, Agent, or Firm* — Cozen O'Connor

(57) ABSTRACT

A conference bridge of a conference system having a plurality of conference stations, the bridge comprising: reception means for receiving dual-channel audio signals coming from the conference station; determination means for determining at least one processing function per conference station of the conference system; application means for applying respective weighing functions to the received dual-channel signals; build-up means for building up one hybrid dual-channel signal for forwarding per conference station by means for summing a portion of the process dual-channel audio signals; and forwarding means for forwarding the respective hybrid dual-channel audio signal to each of the various conference stations of the conference system. A method of forwarding a spatialized audio scene and implemented by a conference bridge is also disclosed.

9 Claims, 4 Drawing Sheets

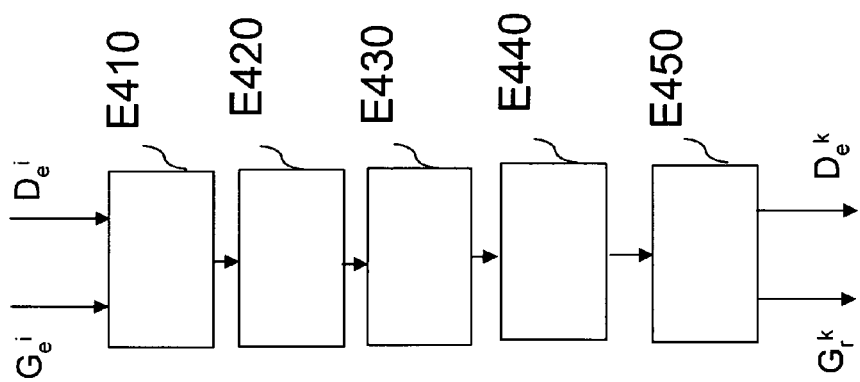

FORWARDING AN AUDIO SIGNAL IN AN IMMERSIVE AUDIO CONFERENCE SYSTEM

RELATED APPLICATIONS

This application claims the priority of French application Ser. No. 07/56017 filed Jun. 26, 2008, the entire content of which is hereby incorporated by reference.

FIELD OF THE INVENTION

The present invention relates to a method of forwarding audio signals in an immersive conference system. More particularly, the present invention relates to an immersive audio conference system having a plurality of conference stations and a conference bridge that implements the method of the invention.

BACKGROUND OF THE INVENTION

In conventional audio conference systems, there exist monophonic listening systems in which it is difficult to distinguish and locate the various speakers in the conference. Other point-to-point audio conference systems transmit the real audio signals picked up by binaural microphones positioned on the head of a dummy. Those microphones serve to pick up the sounds coming from the various speakers in a conference room in distinct manner. The locations of the microphones simulates the locations of the left and right ears of a person. The difference between the sounds picked up by the two microphones makes it possible to obtain location information about the speakers in the room. Such a conference system is described for example in U.S. Pat. No. 7,012,630.

After being digitized, and where necessary compressed, the audio signals as obtained in this way are forwarded to another conference station, which relays them to a pair of loudspeakers or to a plurality of headsets that may be worn by each of the participants.

Natural sound pickup presents the advantage of agreeable listening comfort and a high degree of realism.

Other audio conference systems provide a conference bridge, also known as a multipoint control unit (MPU), that serves to create artificial conference scenes so that the user of a virtual conference room has the impression of having all of the participants in the same room and at different positions therein.

To create this artificial scene, use is made of head-related transfer function (HRTF) filters in order to simulate a position in three dimensions for a speaker. This is described for example in application US 2005/0018039 in which an HRTF filter is defined for each speaker of the conference system. The conference bridge applies a respective HRTF filter for the left ear and for the right ear to a monophonic signal coming from a speaker. A dual-channel signal in binaural format is thus obtained for each speaker.

It is often necessary for a user to intervene in order to propose determined positions for the speakers in three-dimensional space.

In U.S. Pat. No. 7,012,630, such an artificial scene can be created only when there is only one speaker present per conference room. One monophonic signal is then transmitted per conference site so as subsequently to create within the MCU an artificial scene that represents the various speakers at the various sites, which scene is then forwarded to the various sites.

Those artificial scenes as created in that way, even though they make it possible to benefit from spatialized listening, are nevertheless not as realistic as a natural scene of the kind that can be picked up in reality by a binaural sound pickup.

Prior art methods do not make provision for obtaining natural spatialized (or immersive) listening in a multisite and multiuser audio conference. Spatialized conference bridges that exist in the prior art are also incapable of extending the number of participants or the number of sites within the audio conference system over the course of time.

Furthermore, the methods proposed do not make it possible, while listening, simultaneously to locate a participant and to know which conference site the participant belongs to.

The present invention seeks to improve the situation.

SUMMARY OF THE INVENTION

One aspect of the invention is directed to a method of forwarding a spatialized audio scene from a conference bridge in a conference system having a plurality of conference stations. The method comprises the steps of:

receiving dual-channel audio signals coming from the conference stations;

determining at least one processing function per conference station of the conference system;

applying respective processing functions to the received dual-channel signals;

constituting one hybrid dual-channel signal for forwarding per conference station by summing a portion of the dual-channel audio signals as processed in this way; and forwarding the respective hybrid dual-channel audio signals to the various conference stations of the conference system.

Thus, the method makes it possible to superpose natural sound scenes from a plurality of sites. Superposing room tones makes it possible simultaneously to locate the conference speaker even remotely and to determine the corresponding conference site.

In a particular implementation, the same processing function is applied to both signals of a dual-channel signal coming from a conference station.

Applying the same function to the left channel and to the right channel making up the dual-channel signal from a conference station makes it possible to preserve the spatialization of the signal coming from the conference station.

In a preferred implementation, the dual-channel audio signals coming from the conference stations are acquired by means of binaural microphones.

Thus, sound pickup as performed on the various sites makes it possible to obtain dual-channel audio signals that provide speaker location information. The quality of the natural spatialization is conserved in the spatialized audio scene delivered by the method of the invention.

In another implementation, the dual-channel audio signals from some of the conference stations are artificial dual-channel audio signals.

It can happen that some of the conference stations possess only monophonic sound pickup but can nevertheless benefit from the natural spatialization of the other conference stations by means of the method of the invention.

In a first implementation, a processing function is a gain calculated as a function of acoustic characteristics of the room of the corresponding conference station.

With appropriate gain per site, it is possible to equalize the sound levels coming from the various sites or indeed to avoid potential saturation, e.g. when numerous sites are in connection.

In a second implementation, a processing function is a filter characterizing the room tone of the room of the conference station.

An adapted filter per site makes it possible, for example, to emphasize a room tone from a site in order to make it more recognizable, and thus make it possible remotely, and merely by listening, to determine which site a speaker belongs to.

In a third implementation, a processing function is a non-linear function that takes account of variations occurring over time in the room of the corresponding conference station.

It is thus possible to perform processing signals coming from one or more sites, e.g. in order to improve quality or to deliver some arbitrary service. By way of example, this may be a noise-reducing function or echo cancellation. This type of function makes it possible to take account of variations in noise and acoustic echo that can occur over time in the conference stations concerned.

Another aspect of the invention is directed to a conference bridge in a conference system having a plurality of conference stations, the bridge comprising:

reception means for receiving dual-channel audio signals coming from the conference station;

determination means for determining at least one processing function per conference station of the conference system;

application means for applying respective weighing functions to the received dual-channel signals;

build-up means for building up one hybrid dual-channel signal for forwarding per conference station by means for summing a portion of the process dual-channel audio signals; and forwarding means for forwarding the respective hybrid dual-channel audio signal to each of the various conference stations of the conference system.

The conference bridge may be a device that is independent of the conference stations, or in another embodiment, it may be included in one of the conference stations.

Another aspect of the invention is directed to a computer program stored in a memory of a conference bridge and/or stored on a memory medium for co-operating with a reader of the conference bridge, the program including code instructions for implementing the steps of the method of the invention, when said program is executed by a processor of the conference bridge.

BRIEF DESCRIPTION OF THE DRAWINGS

FIG. 4 is a flow chart showing the main steps of a method in accordance with an embodiment of the invention for forwarding a spatialized scene.

DETAILED DESCRIPTION OF THE DRAWINGS

Figure 1:
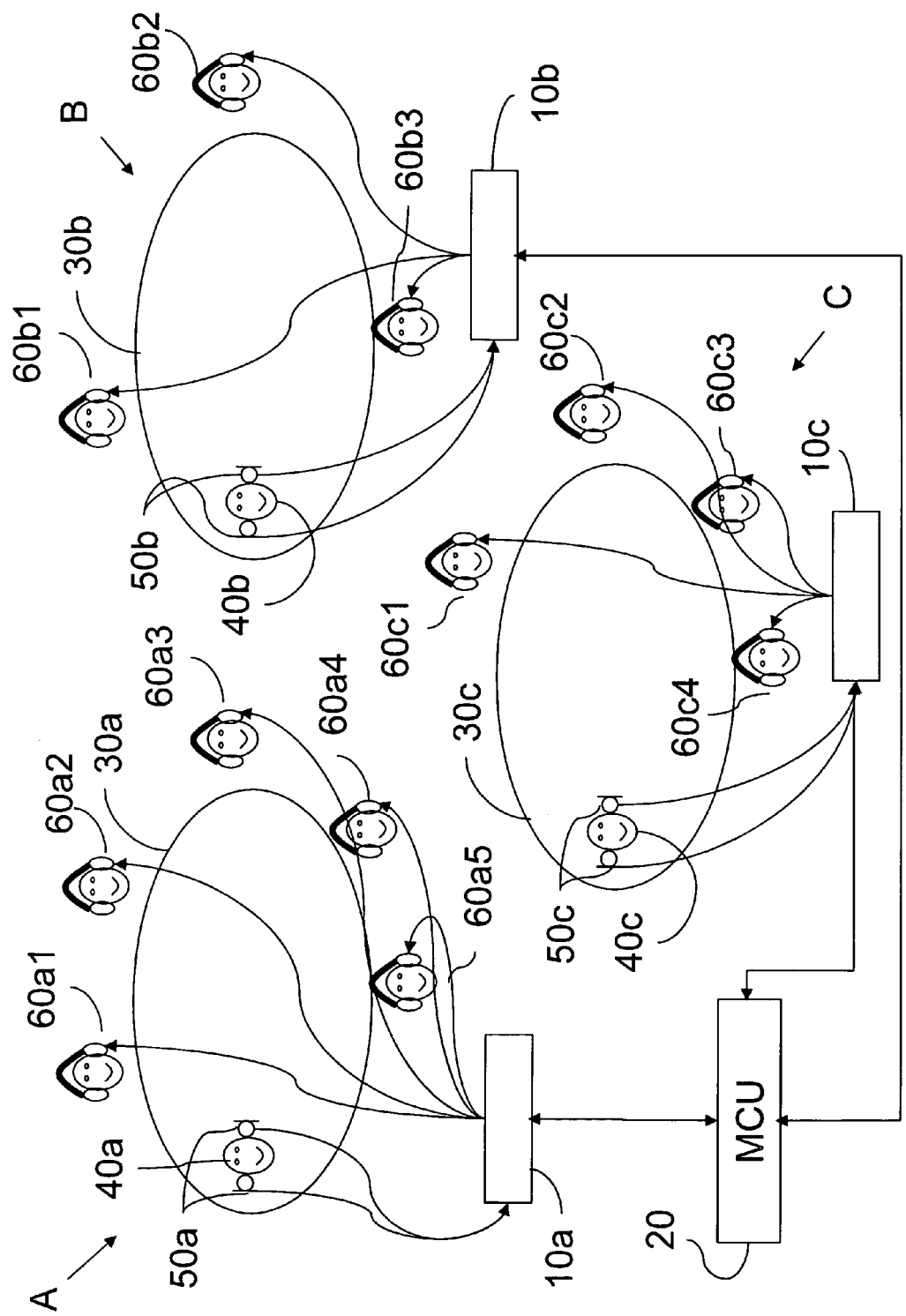
FIG. 1 shows an audio conference system in accordance with an embodiment of the invention.

FIG. 1 shows an example of an audio conference system of the invention. The system shows three conference stations 10a, 10b, and 10c for three respective conference rooms or sites, A, B, and C.

In a conference room, e.g. room A, a dummy head 40a is provided with a pair of binaural microphones 50a. These microphones are positioned on the dummy at locations that correspond to the left ear and the right ear of a person.

In one possible embodiment, the microphones are omnidirectional. They thus serve to pick up sounds coming from all directions, in order to obtain a more natural rendering.

By way of example, the microphones are of the electrostatic type so as to obtain good sound results. Since microphones of that type require a power supply, they can advantageously be powered by a phantom power supply method from a preamplifier placed in the conference station.

The conference table is referenced 30a. Five speakers are positioned around the table, each having their own listening headset 60a1, 60a2, ..., 60a5.

Advantageously, the headsets are of the "open" type that make it possible to hear sounds locally. Nevertheless, it is more appropriate to make provision for an additional local delivery of the room tone as picked up by the microphones at the site. Thus, by reinforcing the sounds from the participants in the local conference, it is possible to allow discussion to take place naturally between the participants at the same site. In order to avoid too much latency in the local return, it is preferable for it to be provided in the local conference station rather than in the conference bridge. Such headsets may be wireless headsets so as to make it easier for the speakers to move about.

The conference station serves to pick up the sounds received from the binaural microphones, to process them, where necessary, and to forward them to the conference room. In return, it receives signals from a spatialized audio scene from the conference bridge 20 and forwards those signals to the various speakers in the room via their respective headsets. The conference station is described below with reference to FIG. 2.

The other conference rooms B and C are fitted in the same manner for three people wearing headsets (60b1, 60b2, 60b3) in room B, and for four people wearing heads (60c1, 60c2, 60c3, 60c4)) in room C.

In a variant embodiment, the headsets could be replaced by miniature loudspeakers placed close to each person (on the back of the chair, for example) or indeed by a single pair of loudspeakers situated close to the dummy head, for example.

A conference bridge 20 may be situated either in a communications network, or in a conference station of the conference system, and it receives the various signals from the conference stations of the conference system. The conference bridge performs the steps of the method of the invention as described below with reference to FIG. 4. The spatialized scene delivered by implementing the method is then transmitted from the conference bridge to the various conference stations.

Figure 3:
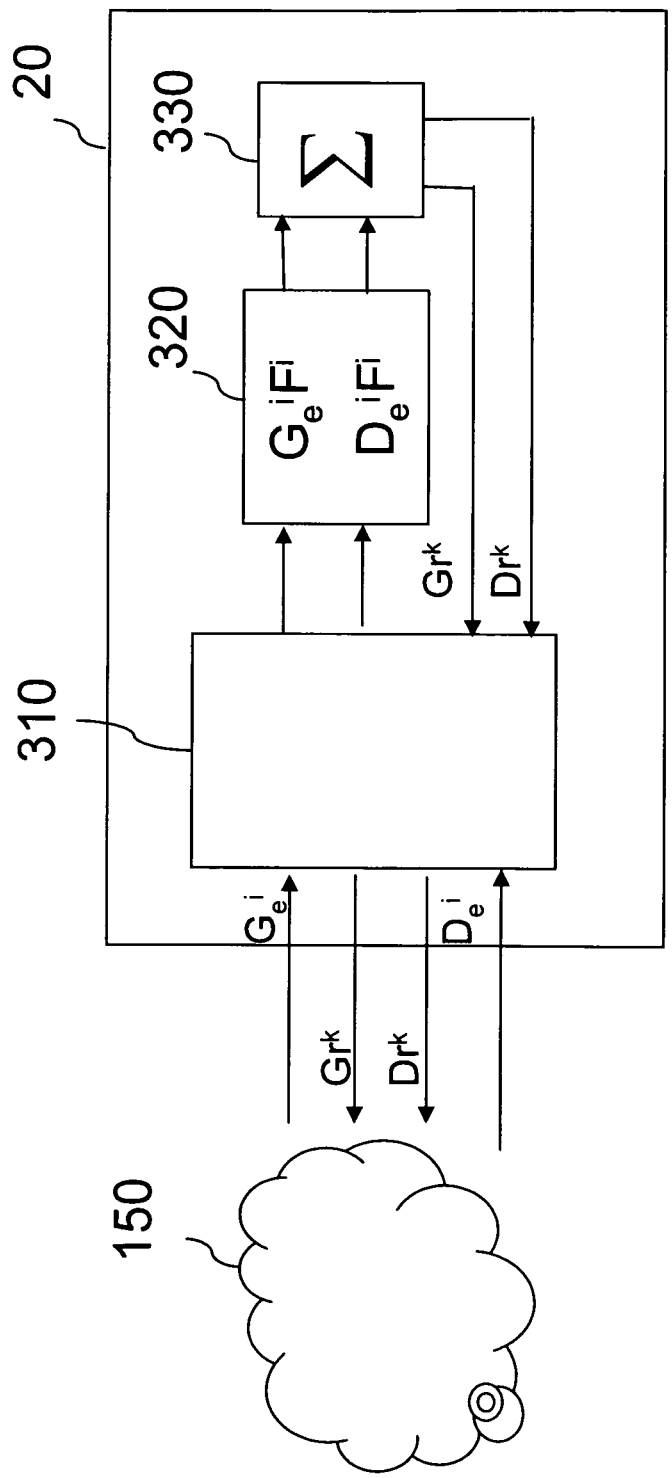
FIG. 3 is a block diagram of the conference bridge in accordance with an embodiment of the invention.

The configuration of a conference bridge is described below with reference to FIG. 3.

Figure 2:
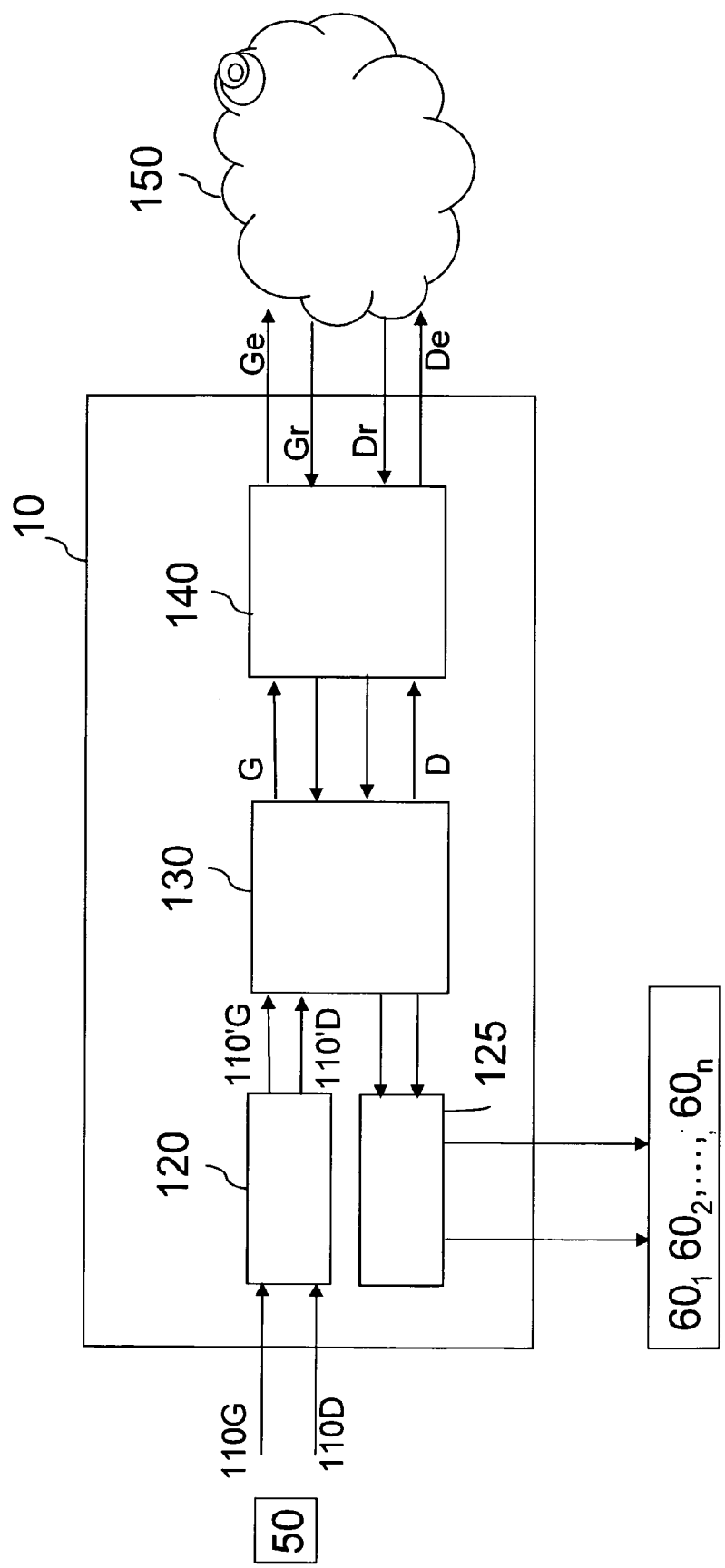
FIG. 2 is a block diagram of a conference station in accordance with an embodiment of the invention.

The architecture of a conference station is described with reference to FIG. 2.

A conference station 10a, 10b, or 10c receives as inputs 110G and 110D the signals coming from the two microphones 50 (a, b, or c depending on the stations concerned). It has a preamplifier 120 suitable for increasing the level of the received signals, while also guaranteeing a good signal-to-noise ratio. The signals 110'G and 110'D coming from the preamplifier are input into a dual-channel analog-to-digital converter module, so as to convert the two sound signals into audio signals G and D. The converter must also be suitable for conserving the highest possible fidelity for the major portion of the audible information. An appropriate sampling frequency therefore needs to be selected. Sampling frequencies of 32 kilohertz (kHz), 44.1 kHz, or indeed 48 kHz give good results, for example. The conversion module may possess two converters so as to convert the right and left signals in parallel.

It is also possible to provide a module possessing a single converter that is clocked appropriately. Under such circumstances, the left and right digital signals G and D are phase offset by one-half of sampling period, and that can lead to a slight deterioration in the spatialization effect.

A communications module 140 connected to a communications network 150 (e.g. of the Internet protocol (IP) type or of the integrated services digital network (ISDN) type) exchanges the digital signals G and D in transmission and in reception. The module may optionally perform compression on the digital signals, e.g. as a function of the passband that is available on the communications network.

In a lossless embodiment, it is possible to use a dual-channel encoder or two single-channel encoders in parallel and to make use directly of the pulse code modulation (PCM) signals, i.e. the signals as sampled and quantized coming from the converters of the module 130.

In another embodiment, a perceptual encoder with information loss (but practically without any audible loss) can be used in order to reduce the data rate.

The communications module is in communication with the conference bridge 20 of the conference system to which it sends transmitted digital audio data $G_e$ and $D_e$.

In return, after processing by the conference bridge 20, the signals of the hybrid spatialized audio scene are received by the communications module 140. Where necessary, the module then decompresses the received signals by using an appropriate codec, and then transforms the received signals into a dual-channel signal prior to delivering them to the converter module 130. At the output from the digital-to-analog conversion, the dual-channel signal is input into the amplifier module 125 that duplicates the signal so as to deliver it to the various headsets connected to the conference station.

The configuration of the conference stations 10b and 10c in FIG. 1 is the same as the configuration of the station 10a as described above.

The architecture of a conference bridge 20 of the invention is described with reference to FIG. 3.

The conference bridge comprises a communications module 310 suitable for receiving the transmitted dual-channel streams $G_e$ and $D_e$ from the various conference stations.

Thus, with reference to FIG. 1, the communications module of the conference bridge 20 receives the dual-channel signal $G_e^1$ and $D_e^1$ from the conference station 10a, the dual-channel signal $G_e^2$ and $D_e^2$ from the conference station 10b, and the dual-channel signal $G_e^3$ and $D_e^3$ from the conference station 10c.

In general, the communications module receives the dual-channels signals $G_e^i$ and $D_e^i$ for i lying in the range 1 to N, where N is the number of conference stations in the conference system.

When these transmission signals have been compressed, the communications module 310 performs appropriate decompression of the audio signals.

A processor module 320 receives as inputs the signals $G_e^i$ and $D_e^i$. The module 320 is adapted to determine at least one processing function $F^i$ per conference site. Thus, with reference to FIG. 1, a processing function $F^1$ is determined for the site A, a function $F^2$ is defined for the site B, and a function $F^3$ is defined for the site C.

The module 320 applies the respective function $F^i$ to the dual-channel signal coming from the corresponding conference site.

In a preferred embodiment, this weighting function $F^i$ is applied identically both to the right signal and to the left signal in the dual-channel signal from the corresponding site i.

In a particular embodiment, it is possible to apply different functions to the right signal and to the left signal. Examples of this embodiment are described in greater detail below.

A module for building up a hybrid station scene 330 is adapted to constitute a hybrid dual-channel reception signal $G_r^i$ and $D_r^i$ for each of the conference stations.

Thus, in order to build up the dual-channel signal for the conference station A, for example, the module 330 sums the processed signals from the sites B and C in order to from the spatial hybrid scene.

Thus, in general, for station k, reception signals $G_r^k$ and $D_r^k$ are obtained in accordance with the following equations:

$$G_r^k = \Sigma_{i \neq k}(F^i \cdot G_e^i)$$

$$D_r^k = \Sigma_{i \neq k}(F^i \cdot D_e^i)$$

Thus, remote natural sound scenes are thus superposed in order to create a hybrid spatial scene.

Superposing room tones thus serves both to locate the speaker of the conference, even remotely, and to determine to which conference site the speaker belongs.

Thus, even if two remote speakers are in the same spatial position in the hybrid spatial scene, the conference rooms are generally different and therefore provide respective different "colors" (specific frequency responses) that act like filters on the voices of the speakers. This thus makes it possible to distinguish a speaker at site A from a speaker at site B, for example.

The reception digital signals $G_r^i$ and $D_r^i$ are then optionally encoded prior to being transmitted.

In a first embodiment, the function $F^i$ could merely be a gain. A respective gain adapted to each of the various sites can thus serve to equalize levels from the various sites.

For example, when the conference rooms at the various sites present very large differences from one another (different sizes, different reverberations), then it is important to be able to equalize levels between the signals coming from the sites.

This gain is applied symmetrically to the right and left signals prior to summing so as to conserve the right/left equilibrium of the natural scene and the precision of the spatialization effect.

In this embodiment, the processing is written as follows:

$$G_r^k(n) = \Sigma_{i \neq k}(F^i \cdot G_e^i(n))$$

$$D_r^k(n) = \Sigma_{i \neq k}(F^i \cdot D_e^i(n))$$

where n is a time index and $F^i$ is a scalar.

Applying a gain can also serve to handle possible saturation but without that disturbing the spatialization effect. For example when numerous sites are connected together, saturation may occur. In order to avoid saturation, it can be advantageous to normalize the result of summing and thus apply attenuation to some of the signals. This attenuation must also be applied in the same manner to the left and right signals so as to retain these spatialization effects.

In a second embodiment, the function $F^i$ is a filter. By determining one filter per site it is possible to accentuate the "coloring" of one site relative to another in the hybrid spatial scene. For example, it can be advantageous to make remote sound scenes less realistic than local sound sources by applying a filter, or it can be advantageous to compensate the natural coloring of a room if it is too marked.

In this embodiment, the processing is written as follows:

$$G_r^k(n) = \Sigma_{i \neq k}(F^i * G_e^i)(n)$$

$$D_r^k(n) = \Sigma_{i \neq k}(F^i * D_e^i)(n)$$

where n is a time index, $F^i$ is a filter, and * is the convolution product.

The function $F^i$ in a third embodiment can be a non-linear function. A non-linear function such as a dynamic compressor can be envisaged. This makes it possible to diminish perceived level differences between signals situated above a certain threshold.

In this embodiment, the processing is written as follows:

$$G_r^k(n) = \Sigma_{i \neq k}(F^i(n) \cdot G_e^i(n))$$

$$D_r^k(n) = \Sigma_{i \neq k}(F^i(n) \cdot D_e^i(n))$$

where n is a time index, $F^i(n)$ is a time-varying gain, and is determined by way of example as follows:

$$F^i(n) = 1 \text{ if } \epsilon(n) \leq S$$

$$F^i(n) = R \cdot (\epsilon(n) - S) + S \text{ if } \epsilon(n) > S$$

where S is the energy threshold above which compression begins, R is the ratio of output energy over desired input energy, and $\epsilon(n)$ is the instantaneous power of the signal given by:

$$\varepsilon(n) = \sqrt{\frac{1}{N} \sum_{m=n-N+1}^{n} (G_e^i(m) + D_e^i(m))^2}$$

where m is a time index and N is the length of an energy observation window.

Another non-linear function may be for example be applying a noise reducer or indeed an echo canceller. This can make it possible to improve the perceived quality.

An acoustic echo canceller makes it possible to take advantage of hands-free listening on a terminal. It eliminates from the microphone signal sent to a correspondent the signal delivered by the loudspeaker and filtered by the environment prior to being picked up by the microphone, so that the correspondent does not hear his or her own voice after a delay (echo phenomenon). This treatment is generally based on using an adaptive filter placed between the signal sent to the loudspeaker and the microphone signal sent to the correspondent.

By way of example, the echo canceller may be implemented when one or more loudspeakers are placed in a conference room instead of the listeners using headsets.

A noise reducer serves to attenuate noise from the environment (background noise), which noise is assumed to be steady. This processing is generally based on a long-term estimate of the characteristics of the noise, and on filtering that is adapted to those characteristics.

A limiter may serve to provide local attenuation on the gain of a high level signal so as to ensure that the signal is not peak limited. A peak-limited signal generates harmonics that are disagreeable to the ear. This processing is generally based on tracking the level of the signal and on applying attenuation when the signal exceeds a certain threshold.

These three kinds of processing are known to the person skilled in the art and are therefore not described in detail herein.

These kinds of processing are concrete examples of the processing applied to the left and right channels in accordance with the invention.

With an echo canceller (or a noise reducer or a limiter), the components of the signal that is to be modified coming from the left and right microphones are generally not identical. When sound is picked up using microphones that do not coincide (having capsules that are not placed at the same points in three dimensions), as applies when using binaural sound pickup, the sound coming from the loudspeaker when an echo canceller is used (or the noise to be eliminated in a noise reducer, or the signal at too high a level when using a limiter) reaches the first microphone with a delay and/or a level and/or a spectrum modification different from the second microphone.

It follows that echo canceling (or noise reduction or limiting) requires the left and right channels to be processed independently in order to optimize the result. This is possible in the method of the invention by applying a different processing function to each of the channels.

Independent processing of the left and right channels leads to changes of level, of phase, and of spectrum that do not correspond between the signals delivered to the left and right ears of the listener, thereby giving rise to a perception of instability in the sound scene.

Thus, in order to ensure that the sound scene is stable, it is preferable to apply the same treatment (changes of delay, level, or spectrum) to the left and right channels, but under such circumstances the parameters for performing processing such as echo canceling (or noise reduction or limiting) need to be calculated on the basis of the left signal or the right signal or the basis of a matrix of both of them (typically the sum left+right), and these parameters need to be applied symmetrically to the left and right channels, which leads to sub-optimal processing on at least one of the two channels.

With non-coinciding sound pickup, there is therefore necessarily a compromise between a sound scene that is stable, and the effectiveness of the processing for echo canceling (or noise reduction or limiting) for each of the ears.

Other signal processing functions can thus be applied so as to improve the quality of the signals or indeed so as to provide some arbitrary service.

The conference bridge as described may be independent of the conference stations of the conference system. In a particular embodiment it may be integrated in one of the conference stations of the system.

The conference bridge may be constituted, for example by a computer, a work station, or indeed a communications terminal.

In a particular embodiment, it is possible to add a speaker or a site to the list of participants in the conference, and to do so using monophonic sound pickup. The processing performed by the conference bridge is then adapted as follows so as to enable the dual-channel audio scene to be forwarded to the participants:

$$G^k_{r\text{-}dual} = \Sigma_{i \neq k}(F^i \cdot G^i_{e\text{-}dual}) + \Sigma_{i \neq k}(F^i X^i \cdot M^i_{e\text{-}mono})$$

$$D^k_{r\text{-}dual} = \Sigma_{i \neq k}(F^i \cdot D^i_{e\text{-}dual}) + \Sigma_{i \neq k}(F^i Y^i \cdot M^i_{e\text{-}mono})$$

with $X^i$ and $Y^i$ being optionally non-linear functions that optionally vary over time, and $M_{e\text{-}mono}$ is the signal delivered by the monophonic microphone from the isolated participant.

If $X^i$ and $Y^i$ are mere gains, then an additional participant is added to the hybrid spatial scene by intensity spatialization based on an intensity difference between the right and left signals.

If $X^i$ and $Y^i$ are filters taking delays and intensities into account, then an additional participant is added to the hybrid spatial scene by amplitude/phase spatialization based on time differences and intensity differences between the right and left signals.

If $X^i$ and $Y^i$ are HRTF filters, then an additional participant is added to the hybrid spatial scene by a binaural system.

The dual-channel audio signals received from the conference stations are then artificial dual-channel audio signals. The participants at those sites can nevertheless take advantage of the spatial hybrid scene delivered by the method of the invention, providing they possess headsets or at least one pair of loudspeakers.

Thus, the method of forwarding a spatialized audio scene in accordance with the invention is described below with reference to FIG. 4. The method is implemented by a conference bridge in the conference system of the invention.

The method comprises a first step E410 of receiving transmission dual-channel signals $G_e^i$ and $D_e^i$ coming from the various conference stations of the conference system. A step E420 of determining at least one processing function $F^i$ per conference station is then implemented. In step E430, the processing functions are applied to the respective dual-channel signals that have been received.

Step E440 then consists in constituting one hybrid dual-channel signal per conference station. This step is performed by summing a portion of the processed dual-channel signals. For a given conference station, the summed processed signals are those coming from the N−1 other conference stations, where N is the number of conference stations in the conference system.

Step E450 of forwarding the hybrid dual-channel signal as constituted in this way to the various conference stations of the conference system is then implemented. These various steps are implemented in a conference bridge as described with reference to FIG. 3.

In the invention, a computer program is stored in a memory of the conference bridge and/or is stored on a memory medium for co-operating with a reader of the conference bridge and/or is downloaded via a communications network. The program includes code instructions for implementing method steps of the invention when said program is executed by a processor of the conference bridge.

What is claimed is:

1. A method of forwarding a spatialized audio scene from a conference bridge in a conference system comprising a plurality of conference stations, each conference station corresponding to a site, wherein the method comprises the steps of:
   receiving dual-channel audio signals coming from the conference stations;
   determining, for each conference station of the conference system, at least one processing function as a function of characteristics of the site of each conference station;
   applying respective processing functions to the received dual-channel audio signals from each conference station, the same processing function being applied to both signals of the dual-channel audio signal coming from a conference station;
   constituting one hybrid dual-channel audio signal for forwarding per conference station by summing a portion of the processed dual-channel audio signals; and
   forwarding the respective hybrid dual-channel audio signals to each of the conference stations of the conference system.

2. The method according to claim 1, wherein the dual-channel audio signals coming from the conference stations are acquired by means of binaural microphones.

3. The method according to claim 1, wherein the dual-channel audio signals from some of the conference stations are artificial dual-channel audio signals.

4. The method according to claim 1, wherein the processing function is a gain calculated as a function of acoustic characteristics of the room of the corresponding conference station.

5. The method according to claim 1, wherein the processing function is a filter characterizing the room tone of the room of the conference station.

6. The method according to claim 1, wherein the processing function is a non-linear function that takes account of variations occurring over time in the room of the corresponding conference station.

7. A non-transitory computer-readable storage medium, in the form of a memory of a conference bridge and/or a memory medium for co-operating with a reader of the conference bridge, the medium storing a computer program including code instructions for implementing the steps of the method according to claim 1, when said program is executed by a processor of the conference bridge.

8. A conference bridge for a conference system having a plurality of conference stations, each conference station corresponding to a site, wherein the conference bridge comprises:
   reception means for receiving dual-channel audio signals coming from each conference station;
   determination means for determining, for each conference station of the conference system, at least one processing function as a function of characteristics of the site of each conference station;
   application means for applying respective processing functions to the received dual-channel audio signals from each conference station, the same processing function being applied to both signals of the dual-channel audio signal coming from a conference station;
   build-up means for building up one hybrid dual-channel audio signal for forwarding per conference station by means for summing a portion of the processed dual-channel audio signals; and
   forwarding means for forwarding the respective hybrid dual-channel audio signal to each of the conference stations of the conference system.

9. The conference bridge according to claim 8, wherein the conference bridge is included in one of the conference stations of the conference system.

* * * * *